United States Patent

Kitsuno et al.

[11] Patent Number: 6,027,705
[45] Date of Patent: Feb. 22, 2000

[54] METHOD FOR PRODUCING A HIGHER SILANE

[75] Inventors: Yu Kitsuno, Chichibu; Kotaro Yano, Chiba; Syoichi Tazawa, Kawasaki; Shinya Matsuhira, Kawanuma-gun; Tetsuo Nakajo, Kawasaki, all of Japan

[73] Assignee: Showa Denko K.K., Tokyo, Japan

[21] Appl. No.: 09/201,874

[22] Filed: Nov. 30, 1998

Related U.S. Application Data

[60] Provisional application No. 60/081,201, Apr. 9, 1998.

[30] Foreign Application Priority Data

Jan. 8, 1998 [JP] Japan .................................. 10-002530
Mar. 3, 1998 [JP] Japan .................................. 10-050841

[51] Int. Cl.$^7$ .............................. C07F 7/08; C01B 33/04
[52] U.S. Cl. ............................................................ 423/347
[58] Field of Search ............................................. 423/347

[56] References Cited

U.S. PATENT DOCUMENTS

| | | | |
|---|---|---|---|
| 4,950,373 | 8/1990 | Sundermeyer et al. | 204/164 |
| 5,089,244 | 2/1992 | Parent et al. | 423/347 |
| 5,252,766 | 10/1993 | Sakakura et al. | 556/430 |

FOREIGN PATENT DOCUMENTS

| | | |
|---|---|---|
| 2139155 | 2/1973 | Germany . |
| 36-21507 | 11/1961 | Japan . |
| 57-27915 | 2/1982 | Japan . |
| 60-141613 | 7/1985 | Japan . |
| 60-251114 | 12/1985 | Japan . |
| 60-255612 | 12/1985 | Japan . |
| 60-260418 | 12/1985 | Japan . |
| 62-132720 | 6/1987 | Japan . |
| 62-132721 | 6/1987 | Japan . |
| 1-198631 | 8/1989 | Japan . |
| 2-184513 | 7/1990 | Japan . |
| 3-183613 | 8/1991 | Japan . |
| 3-183614 | 8/1991 | Japan . |
| 5-32785 | 2/1993 | Japan . |

*Primary Examiner*—Paul F. Shaver
*Attorney, Agent, or Firm*—Sughrue, Mion, Zinn, Macpeak & Seas, PLLC

[57] ABSTRACT

A method for producing tri- or higher-silane from mono- or lower-silane characterized by reacting a lower silane in the first reaction zone and reacting a portion or all of the reaction product thereof in a reaction zone of the second or subsequent reaction zone.

13 Claims, 1 Drawing Sheet

METHOD FOR PRODUCING A HIGHER SILANE

CROSS REFERENCE TO RELATED APPLICATIONS

This application is an application filed under 35 U.S.C. § 111(a) claiming benefit pursuant to 35 U.S.C. §119(e)(1) of the filing date of the Provisional Application 60/081,201, filed Apr. 9, 1998, pursuant to 35 U.S.C. §111(b).

BACKGROUND OF THE INVENTION

1. Field of the Invention

The present invention relates to a method for producing a higher silane useful as a starting material for producing semiconductor silicon and the like. Since higher silanes such as trisilane, tetrasilane, pentasilane, hexasilane and heptasilane are more easily decomposed than lower silanes such as monosilane and are low in loss by evaporation during film formation, when they are used as starting materials for producing polycrystalline silicon, epitaxial silicon or amorphous silicon, it is possible to attain a decrease in the film forming temperature, an improvement in the film forming rate and an increase in the formed film yield. Therefore, it is expected that they will be widely used.

2. Description of the Related Art

Many methods for producing higher silanes are known as shown below: (1) Reduction of silicon by hydrogen, using hydrogen sulfide or a metal sulfide as a catalyst (Japanese Examined Patent Publication (Kokoku) No. 36-21507, etc.), (2) Reduction of a silicon compound having a plurality of chlorines (Japanese Unexamined Patent Publication (Kokai) No. 57-27915, etc.), (3) Reaction between an oxygen compound of silicon having Si-H or Si-Si bond and a hydride, an alkoxide or an amalgam of an alkali (earth) metal (Japanese unexamined Patent Publication (Kokai) Nos. 60-255612, 60-251114, 60-260418, etc.), (4) Reaction between a magnesium-silicon alloy and an acid (Japanese Unexamined Patent Publication (Kokai) No. 60-141613, etc.), (5) Electric discharge in monosilane gas (Japanese Unexamined Patent Publication (Kokai) Nos. 62-132720 and 62-132721, etc.), (6) Dehydrogenation condensation of hydrosilanes using a platinum-group metal complex as a catalyst (Japanese Unexamined Patent Publication (Kokai) Nos. 1-198631 and 2-184513), (7) Dehydrogenation condensation of hydrosilanes using a lanthanoid complex as a catalyst (Japanese Unexamined Patent Publication (Kokai) No. 5-32785), and (8) Pyrolysis of tri-, tetra- and penta-silanes using glass wool or palladium/silica and glass wool as a catalyst (German Patent No. 2139155). The present inventors disclosed a low cost and safe method for producing higher silanes by pyrolizing monosilane with an alumina catalyst or without a catalyst (Japanese Unexamined Patent Publication (Kokai) Nos. 3-183613 and 3-183614).

However, the above known methods have many problems to be solved before commercial application is possible.

That is, the method by reducing silicon with hydrogen using hydrogen sulfide or a metal sulfide as a catalyst cannot exclude contamination by hydrogen sulfide in the product.

In the method using reducing a silicon chloride compound, the starting material of a higher chlorinated silane compound is expensive because of the difficulty in manufacture, and when an alkali metal is used as a reducing agent, control of the reaction is difficult since the reaction is severe, and an alkali metal, having a high possibility of burning and therefore being difficult to handle, must be used in a large amount. On the other hand, in the method by reducing alkyl aluminum halide/trialkylaluminum, an organic silicon compound, which is difficult to remove, contaminates the product.

In the method using a reaction between an oxygen compound of silicon having Si-H or Si-Si bond and a hydride, an alkoxide or an amalgam of an alkali (earth) metal, the alkali (earth) metal or its hydride, etc., having a high possibility of burning and being difficult to handle, must be used in a large amount and, in particular, in the amalgam reduction method, commercial application involves problems since poisonous mercury must be used.

In the method using a reaction between a magnesium-silicon alloy, the yield is low since oxygen-containing impurities such as siloxane are formed and the yield of the higher silane is lower since monosilane is formed in a large amount.

In the method using electric discharge in a monosilande gas, there are many problems, e.g., the apparatus is expensive and requires much energy, the conversion rate is low, and the selectivity of the higher silane among the decomposed compounds is low with the remainder being a powder of hydrogen-containing silicon.

In the method using dehydrogenation condensation of hydrosilanes using a platinum-group metal complex as a catalyst, the catalyst activity is low, the by-product amount is high, the products are only up to trisilane, and the production of the higher silane is low.

In the method disclosed by the present inventors, an increase in the yield of disilane and trisilane is attained by preventing production of tetra- or higher-silanes.

In the method using dehydrogenation condensation of hydrosilanes using a lathanoid complex as a catalyst, the reaction takes a few days and the productivity is low.

In the method using pyrolysis of tri-, tetra- and penta-silanes using glass wool or palladium/silica and glass wool as a catalyst, a higher silane is used to obtain a further higher silane and the starting material is expensive. Therefore, this method cannot be commercially used at present.

The object of the present invention is to provide a method for producing a liquid higher silane comprising a large amount of components in a range of from trisilane to nonasilane by pyrolizing a lower silane comprised mainly of easily available monosilane or disilane.

SUMMARY OF THE INVENTION

The present invention was made to solve the above problems and basically resides in a method for producing a higher silane from a lower silane characterized by reacting a lower silane in a first reaction zone and reacting a portion or all of the reaction product thereof in a reaction zone of a second or subsequent reaction zone. In accordance with the present invention, it was suprisingly found that multi-stage disproportionation reaction of a lower silane to a higher silane can provide a practically useful higher silane.

More specifically, the present invention provides a method for producing tri- or higher-silane from mono- or di-silane, comprising the steps of conducting a first reaction of a first silane mainly comprised of monosilane and/or disilane in a first reaction zone at a first temperature higher than ambient temperature to form a second silane including an increased amount of di- or higher silane than said first silane; and then conducting a second reaction of a portion or all of the reaction product of said first reaction at a second temperature higher than ambient temperature in a second or subsequent reaction zone to form a third silane including trior higher-silane, provided that at least when all the reaction product of the first reaction is subjected to said second reaction, said second temperature is lower than said first temperature.

The reaction zone of the second or subsequent reaction zone in the present invention means the second reaction zone (this can be the final reaction zone) or a plurality of successive reaction zones from the second reaction zone to the final reaction zone.

The method of the present invention includes a preferable method in which the product obtained in each reaction zone is separated into a lower silane and a higher silane or a lower boiling point component and a higher boiling point component and the higher silane or the lower boiling point component is transported to the next reaction zone and the lower silane is returned to said reaction zone or a reaction zone previous thereto.

DETAILED DESCRIPTIONS OF THE INVENTION

Figure 1:
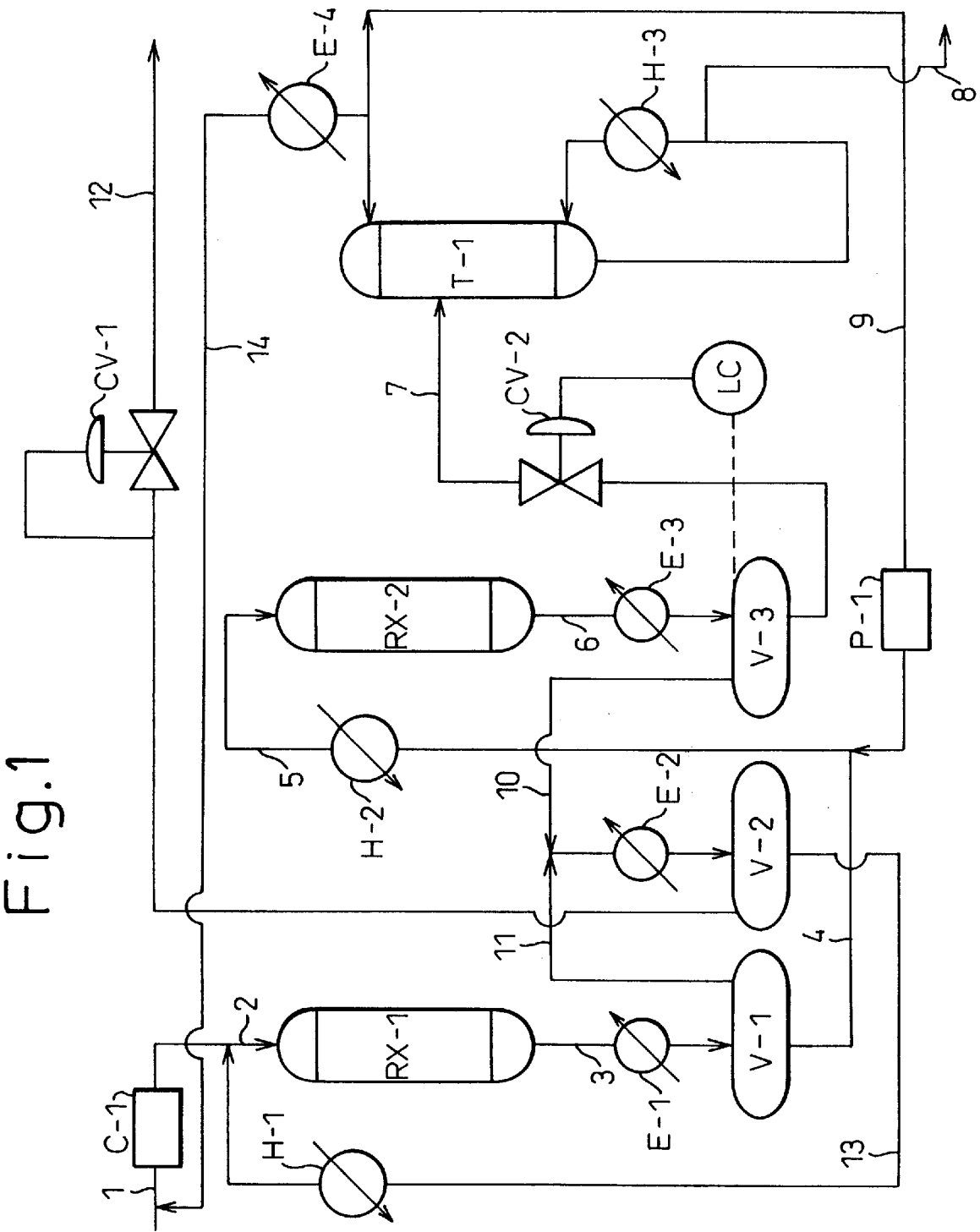
FIG. 1 is a flow sheet showing an example of an apparatus for carrying out the present invention.

The lower silane in the present invention may comprise, in general, monosilane and/or disilane, or monosilane and/or disilane including a small amount of trisilane or higher silanes, but must be gaseous at the ambient temperature and ambient pressure.

The higher silane in the present invention may comprise silanes having three or more silicon atoms, preferably silanes of from trisilane ($Si_3H_8$) to heptasilane ($Si_7H_{16}$) or a mixture thereof, which are liquid at ambient temperature, but, as long as it remains liquid, the higher silane may include a small amount of further higher silanes such as octasilane and nonasilane and lower silanes such as disilane as impurities.

The reaction utilized in the present invention is reaction of a silane to form another silane having a larger number of silicone atoms, more specifically, disproportionation of a silane to a combination of said original silane and other silanes having a higher number of silicon atoms than said original silane, which preferably occurs at a temperature higher than ambient or room temperature.

In the present invention, the low boiling point component and high boiling point component are relatively defined. For example, between monosilane and disilane, the former is the low boiling point component and the latter is the high boiling point component, and between disilane and a higher silane of tri- or higher-silane, the disilane is the low boiling point component and the higher silane is the high boiling point component.

In accordance with the present invention, the lower silane first is subjected to reaction, disproportionation, in the first reaction zone. Here, disilane can be used as the lower silane of the starting material. Preferably, monosilane or monosilane containing a small amount of disilane is used. A second reaction zone may be connected to the first reaction zone in the direct series and the product in the first reaction zone be sent to the second reaction zone. However, for example, when monosilane is used as the starting silane, it is preferred that the product in the first reaction zone is separated to a lower silane mainly comprised of monosilane (low boiling point component) and a component having a higher boiling point than said lower silane, i.e., a component mainly comprised of silanes having two or more silicon atoms (high boiling point component), and the low boiling point component is returned to the first reaction zone to be recycled. The high boiling point component is transferred to the second reaction zone. Since the lower silane contains hydrogen, the hydrogen is separated and released out of the system.

The lower silane used in the first reaction zone may be mixed with the low boiling point component mainly comprised of monosilane formed in the second or subsequent reaction zone.

The second reaction zone may be connected to the first reaction zone in the direct series and the product obtained in the first reaction zone be subjected to reaction in the second reaction zone. These two reaction zones are generally two independent reactors connected to each other, but may be constructed by a structure comprised of two reaction zones separated in one reactor so as to have, for example, different temperatures.

In the second reaction zone, all the product of the first reaction zone can be subjected to reaction but, preferably, only the component of the product in the first reaction zone, which component is the remainder after a component mainly comprised of unreacted lower silanes such as monosilane is separated from said product and returned to the first reaction zone, is subjected to reaction. If the second reaction zone is further connected to the third reaction zone and so on, the reaction and separation similar to the above may be conducted in up to the final reaction zone. That is, the product obtained in each reaction zone is separated to a low boiling point component mainly comprised of unreacted silanes such as monosilane and a high boiling point component mainly comprised of silanes having increased silicon atoms such as disilane, trisilane or higher-silanes obtained as the reaction product; the low boiling point component is returned to the same reaction zone where it was obtained or a reaction zone previous thereto; and the high boiling point component, except that obtained in the final reaction zone, is subjected to reaction in the next reaction zone.

In the final reaction zone, a higher silane is separated and recovered from the obtained product. The component other than the higher silane is returned to and recycled and used in a single or a plurality of reaction zones of from the first to final reaction zones. The higher silane separating method may be any ones. For example, the difference in boiling point may be used to separate a higher silane (the condensate) and a lower silane (the non-condensate) in a cooler. The lower silane is returned to any single or a plurality of reaction zones, without separation, or after it is separated to a component mainly comprised of monosilane and a component mainly comprised of disilane. If monosilane, as the lower silane, is subjected to reaction in the first reaction zone, the component mainly comprised of monosilane is preferably returned to the first reaction zone and the component mainly comprised of disilane be returned to the second or subsequent reaction zone.

The product obtained in the final reaction zone may be separated by a distillation column. In this case, all of the product may be distilled or, after a component mainly comprised of the lower silane such as monosilane is previously separated as the non-condensate in a cooler, the remaining condensate may be separated by a distillation column. By this, the higher silane is recovered as the final product and the other components are returned to the reaction zones for recycled use as described before. The distillation may be conducted batch-wise to separate an initial distillation component, a main distillation component and the bottom remainder, or may be conducted in a continuous manner.

In the above, the descriptions mainly referred to the case where the product obtained in a reaction zone other than the final reaction zone is separated into a component mainly comprised of monosilane and a component mainly comprised of disilane. However, if an increase in the content of the higher silane, for example, tetra- and higher-silanes is aimed, for example, the product in the second reaction zone may be separated into a component mainly comprised of monosilane and disilane and a component mainly comprised of tri- and higher-silanes and the latter be supplied to the third reaction zone.

As a typical example of the present invention, an embodiment, wherein a lower silane mainly comprised of monosilane is used as the starting material and two reaction zones are used, is described in the following. This method comprises the three steps.

(First step)

The step of introducing and reacting a lower silane in a first reaction zone, separating the product thereof in a first condenser to a non-condensed substance mainly comprised of hydrogen gas and monosilane and a condensed substance having a boiling point higher than said non-condensed substance, and separating the hydrogen gas from the non-condensed substance in a second condenser to release the same out of the system and return the component mainly comprised of monosilane to the first reaction zone.

(Second step)

The step of introducing, to a second reaction zone, said condensed substance obtained in the first condenser in the first step, to react the same therein, separating in a third condenser the product thereof to a non-condensed substance mainly comprised of monosilane and a condensed substance, and returning the non-condensed substance to the second condenser or the first reaction zone in said first step or to the second reaction zone.

(Third step)

The step of charging and fractioning, in a distillation column, the condensed substance separated in said third condenser to recover a higher silane as a final product, returning a component mainly composed of monosilane to the first reaction zone in said first step and returning a component mainly composed of disilane to the second reaction zone in the second step.

In the present invention, each reaction zone may or may not include a catalyst. If a catalyst is included, the catalyst used may be alumina, silica, or a platinum group metal or a complex thereof supported by a support such as silica. If a catalyst is not included, a vacant space may be used but preferably an inert filler such as glass or porcelain is filled to improve the thermal conduction. The shape of the filler is not particularly limited, but a shape having as large a contact area, as low a pressure loss and as low a clogging factor as possible, is preferred. For example, the shapes of a sphere, a cylinder, a modified cylinder, a saddle, etc. may be mentioned.

The reaction conditions in each reaction zone depend on the presence or absence of, and the type of, the catalyst, but, generally, in the first reaction zone, the heating temperature is 350° C. to 550° C., preferably 400° C. to 500° C., and the gas space velocity is 20 to 2000 $hr^{-1}$. If the temperature is lower than 350° C., the production of the higher silane may not be sufficient. If the temperature is higher than 550° C., deposition of silicon may occur. In each reaction zone of the second and subsequent reaction zones, the heating temperature is 250° C. to 450° C., preferably 300° C. to 400° C., and is preferably lower than that of the first reaction zone. The reason why the temperatures of the second and subsequent reaction zones are made lower than that of the first reaction zone, is that although the reaction of monosilane is the main reaction in the first reaction zone, the reaction of silane having silicon atoms more than monosilane is the main reaction in the second and subsequent reaction zones and the latter reaction involves a lower energy than the former. If a catalyst is used, a lower side temperature in said temperature range may be used. The gas space velocity is appropriate at 10 to 1000 $hr^{-1}$. If the temperature in the second reaction zone is lower than 250° C. or higher than 450° C., the production of the higher silane may not be sufficient.

The pressure in each reaction zone may be either ambient pressure, an increased pressure or a reduced pressure, but preferably the reaction is conducted under an ambient pressure or under an increased pressure of 1.1 MPa or less, more preferably 0.2 to 0.9 MPa. The reaction under an increased pressure is economically advantageous from the viewpoints of separation efficiency, cooling cost and apparatus size.

The material of the reactor is not particularly limited if it resists the above heating temperature and is stable in a reducing atmosphere (in contact with high temperature hydrogen), but a metal material such as stainless is preferred from the viewpoints of easy handling, cost, etc.

The starting gas may have any purity, but it is preferred that the total purity of monosilane and silanes having a plurality of silicon atoms is preferably 99% or more.

The gas to be introduced in the reaction zone may be diluted or may not be diluted, but it is generally preferred that it is diluted. The diluting gas may be an inert gas which does not react with monosilane, for example, hydrogen, nitrogen, argon and helium. If the dilution is made, the amount of the lower silane is 10 to 80% by volume, more preferably 20 to 60% by volume. If it is lower than 10% by volume, the productivity is low and it is uneconomical. If it is higher than 80% by volume, the deposition of silicon may increase.

In order to efficiently utilize the starting material, as described before, the reaction product is preferably separated to a component mainly composed of monosilane and a component mainly composed of disilane, and all or a portion of the former be returned to the reactor (inclusive through a condenser). The separation may be done by known methods such as cooling and adsorption. The conditions for recovery by the cooling are that, if the above mentioned separation is conducted, the outlet gas of each reaction zone is cooled to the boiling point of disilane (−14.5° C. at atmospheric pressure) or lower, preferably from the temperature lower than the boiling point of disilane by 25° C. to the temperature higher than the boiling point of monosilane (−111.9° C. at atmospheric pressure) by 10° C., the condensed substance is supplied to the second reaction zone, and preferably the non-condensed substance together with a fresh material are supplied to the first reaction zone. If the cooling temperature is lower than this temperature range, the recovering rate of monosilane increases. If the cooling temperature is higher than this temperature range, the recovering rate of disilane becomes insufficient. If the component mainly comprised of monosilane is returned to the first reaction zone, hydrogen, a by-product, accumulates in the system and therefore the non-condensed component is preferably removed out of the system intermittently or continuously. It is preferred from the economical viewpoint that the gas to be removed out of the system is cooled to a temperature lower than the boiling point of monosilane by 20 to 170° C. to recover the silane component, followed by releasing it through a cleaning equipment. The amount of the gas removing from the system is adjusted such that the hydrogen dilution rate is in the above preferable range, that is, the lower silane is in a range of 10 to 80% by volume, more preferably 20 to 60% by volume.

In accordance with the present invention, a higher silane useful as a starting material for producing polycrystalline silicon, epitaxial silicon, amorphous silicon and the like can be obtained from a cheap and easily available gaseous lower silane comprising mainly monosilane.

EXAMPLES

The present invention is described more in detail with reference to examples in the following, but these are not intended to limit the present invention.

In the following, the yield of the silicon is the percent of the silicon content in the product to the silicon content in the starting silane. For example, the yield is 100% if one mole of disilane is produced from two moles of monosilane.

The boiling points of monosilane and disilane at 0.22 MPa and 0.9 MPa are the following (Gmelin Handbook of Inorganic Chemstry, Si Supplement Vol. B1).

| Pressure | Monosilane | Disilane |
| --- | --- | --- |
| 0.22 MPa | −97° C. | 6° C. |
| 0.9 MPa | −64° C. | 58° C. |

Example 1

A 2.5L-SUS reactor 1 and a 5L-SUS reactor 2 were connected in the direct series, the inside temperature of the reactor 1 was set to 450° C. and the inside temperature of the reactor 2 was set to 350° C. The pressure was set to 0.11 MPa. Monosilane was supplied to the reactor 1 at a rate of 15 L/min. The outlet gas of the reactor 2 was analyzed to find that the yields of respective silane compounds are: monosilane ($SiH_4$) 89.6%, disilane ($Si_2H_6$) 3.99%, trisilane ($Si_3H_8$) 2.27%, tetrasilane ($Si_4H_{10}$) 1.80%, pentasilane ($Si_5H_{12}$) 1.11%, hexasilane ($Si_6H_{14}$) 0.68%, heptasilane ($Si_7H_{16}$) 0.37%, octasilane ($Si_8H_{18}$) 0.17% and nonasilane ($Si_9H_{20}$) 0.05%, and the total yield of from $Si_3H_8$ to $Si_9H_{20}$ was 6.45%.

Comparative Example 1

The experiment was carried out in the same manner as in Example 1 except that only one 7.5L (the total volume of the reactors 1 and 2 in Example 1)-SUS reactor with a temperature being set to 450° C. was used. The outlet gas of the reactor was analyzed to find that the yields of respective silane compounds are: $SiH_4$ 85%, $Si_2H_6$ 6.0%, $Si_3H_8$ 2.4%, $Si_4H_{10}$ 0.8%, $Si_5H_{12}$ 0.26%, $Si_6H_{14}$ 0.08%, $Si_7H_{16}$ 0.02%, $Si_8H_{18}$ 0.007% and $Si_9H_{20}$ 0.002%, and the total yield of from $Si_3H_8$ to $Si_9H_{20}$ was 3.6%.

Example 2

As the first reactor, a cooling trap set to −70° C. was provided to the outlet of the apparatus used in Comparative Example 1, a portion of the non-condensed gas from the trap was released out of the system, and the remaining gas was mixed with the starting gas and recycled to the reactor. After the inside temperature of the reactor was set to 450° C., the system was evacuated to a vacuum, and hydrogen as a diluting gas was first introduced to 0.07 MPa and then monosilane was introduced to 0.22 MPa. The reaction was conducted with the flow rate of recycling gas of 18 L/min, the flow rate of starting monosilane of 270 mL/min and the flow rate of releasing gas of 180 mL/min for 10 hours. 168 grams of liquid was accumulated in the cooling trap.

The inside temperature of a 100 mL-reactor as the second reactor was set to 375° C., hydrogen as the diluting gas was supplied at 3 mL/min and the vapor evaporated from the above condensed liquid was supplied at 3 mL/min. After the reaction was continued for 3 hours, the outlet gas was analyzed to reveal that the yields of respective silane compounds are: $SiH_4$ 30.5%, $Si_2H_6$ 31.6%, $Si_3H_8$ 17.1%, $Si_4H_{10}$ 11.95%, $Si_5H_{12}$ 5.5%, $Si_6H_{14}$ 2.3%, $Si_7H_{16}$ 0.8%, $Si_8H_{18}$ 0.2% and $Si_9H_{20}$ 0.04%, and the yield of from $Si_3H_8$ to $Si_9H_{20}$ was 28.2%.

Example 3

Monosilane was reacted in the same manner as in Example 2 for 30 hours to obtain 508g of a condensed liquid. To examine the reactivity of this condensed liquid as the starting material, an apparatus in which a cooling trap was provided to the outlet of a 2L-reactor, a portion of the non-condensed liquid leaving the trap was released out of the reactor and the remainder was mixed with a gas evaporated from the above condensed liquid and recycled to the reactor, was prepared. After the temperature of the cooling trap was set to 8° C. and the inside temperature of the reactor was set to 375° C., the system was evacuated to a vacuum and hydrogen as the diluting gas was first introduced to 0.07 MPa and the above condensed liquid was introduced to 0.22 MPa. The flow rate of the recycling gas was 6 L/min, 0.34 g/min of said condensed liquid was supplied along with 60 mL/min of hydrogen gas, and a portion of the recycling gas was released out of the system to maintain a constant pressure. After the reaction was continued for 10 hours, the outlet gas of the reactor was analyzed to reveal that $SiH_4$ 41.2%, $Si_2H_6$ 19.1% and $Si_3H_8$ 0.5%, the yield of from $Si_3H_8$ to $Si_9H_{20}$ among the condensed liquid in the trap was 38% based on the starting condensed liquid, and 30% based on the monosilane supplied to the first reactor.

Example 4

A test apparatus as shown in FIG. 1 was prepared and a continuous reaction was carried out. The pressure of the reactor was 0.9 MPa and the evaporating system was at the atmospheric pressure.

From 1, monosilane gas is supplied at a rate of 960 g/min, mixed with monosilane (containing a small amount of disilane) 13 recycling from the system, and introduced 2 to the first reaction zone (RX-1, effective volume of 33L). The reaction temperature is 450° C. and the residence time is 10 seconds in the reactor (RX-1). The outlet gas 3 of the reactor (RX-1) is cooled to −8° C. and the condensed liquid 4 is mixed with a recycling liquid 9 from a subsequent distillation column and introduced to a second reaction zone (RX-2, effective volume of 37L) through an evaporator (H-2). The reaction temperature is 375° C. and the residence time is 20 seconds in the reactor (RX-2). On the other hand, the non-condensed gas 11 from the outlet gas of the reactor (RX-1) together with the other recycling gas 10 are cooled and trapped by a two stage cooler set at −100° C. (E-2), and recycled to the reactor (RX-1). The non-condensed gas 12 is released out of the system through a cleaning equipment.

The outlet gas 6 of the reactor (RX-2) is cooled to −8° C. by a cooler (E-3), and the condensed liquid 7 is evaporated in an evaporator (T-1) to separate into the target products of higher silanes 8 of from $Si_3H_8$ to $Si_9H_{20}$, lower silanes (mainly of disilane) 9 and the non-condensed gas (mainly of monosilane) 14.9 is recycled to the reactor (RX-2) and 14 to the reactor (RX-1). The non-condensed gas 10 from the outlet of the reactor (RX-2) is recycled to the reactor (RX-1) as described before.

The composition of the final product 8 after the reaction reaches the constant state was $Si_3H_8$ 40.4%, $Si4H_{10}$ 29.6%, $Si_5H_{12}$ 15.8%, $Si_6H_{14}$ 8.4%, $Si_7H_{16}$ 3.9%, $Si_8H_{18}$ 1.6% and $Si_9H_{20}$ 0.4%, the amount of the obtained silanes of from $Si_3H_8$ to $Si_9H_{20}$ was 696 g/min, and the yield thereof was 76.1%.

We claim:

1. A method for producing tri- or higher-silane from mono- or di-silane, comprising the steps of:

conducting a first reaction of a first silane mainly comprised of monosilane and/or disilane in a first reaction zone at a first temperature higher than room temperature to form a second silane including an increased amount of di- or higher silane than said first silane, and then conducting a second reaction of a portion or all of the reaction product of said first reaction at a second temperature higher than ambient temperature in a second or subsequent reaction zone to form a third silane including tri- or higher-silane, provided that at least when all the reaction product of the first reaction is subjected to said second reaction, said second temperature is lower than said first temperature.

2. The method according to claim 1, wherein mono- and/or di-silanes are separated from said second silane obtained in said second or subsequent reaction zone and are then returned to said first reaction zone.

3. The method according to claim 1, wherein said first silane is monosilane or is mainly comprised of monosilane, and is gaseous at ambient temperature and ambient pressure.

4. The method according to claim 1, wherein said first silane is disilane or is mainly comprised of disilane, and is gaseous at ambient temperature and ambient pressure.

5. The method according to claim 1, wherein said second silane is separated into a first component and a second component having a boiling point lower than said first component, and said second component is returned to said second or subsequent reaction zone where said second silane is obtained or to a reaction zone which is previous to that reaction zone.

6. The method according to claim 1, wherein a reaction product obtained in a final reaction zone of said second or subsequent reaction zone is separated into a third component and a fourth component having a boiling point lower than said third component, and said third component is recovered as a tri- or higher-silane product and said fourth component is returned to at lease one of from said first to final reaction zones.

7. The method according to claim 1, wherein said second reaction temperature is lower than said first reaction temperature.

8. The method according to claim 1, wherein said first reaction temperature is 350 to 550° C. and said second reaction temperature is 250 to 450° C., said second reaction temperature being lower than said first reaction temperature.

9. The method according to claim 1, wherein the higher silane is a silane having 3 to 7 silicon atoms.

10. A method for producing a higher silane of tri- or higher-silane from a lower silane of mono- or di-silane in a reaction system, comprising:

a first step of introducing and reacting the lower silane in a first reaction zone, separating the obtained reaction product in a first condenser to a non-condensed substance mainly comprised of hydrogen gas and monosilane and a condensed substance having a boiling point higher than said non-condensed substance, and separating the hydrogen gas from the non-condensed substance in a second condenser to release the same out of the reaction system and return the component mainly comprised of monosilane to the first reaction zone;

a second step of introducing, into a second reaction zone, said condensed substance obtained in the first condenser in the first step, to react the same therein, separating in a third condenser the obtained reaction product in said second reaction zone to a non-condensed substance mainly comprised of monosilane and a condensed substance, and returning the non-condensed substance to the second condenser or the first reaction zone in said first step or the second reaction zone; and a third step of charging and fractioning, in a distillation column, the condensed substance separated in said third condenser to recover the higher silane as a final product, returning a component mainly composed of monosilane to the first reaction zone in said first step, and returning a component mainly comprised of disilane to the second reaction zone in the second step.

11. The method according to claim 10, wherein the reaction of the second or subsequent reaction zone is conducted at a temperature lower than the temperature of the first reaction zone.

12. The method according to claim 10, wherein the temperature of the first reaction zone is 350 to 550° C. and the temperature of the second or subsequent reaction zone is 250 to 450° C., the reaction in the second or subsequent reaction zone being conducted at a temperature lower than the temperature of the first reaction zone.

13. The method according to claim 11, wherein the higher silane is a silane having 3 to 7 silicon atoms.

\* \* \* \* \*